United States Patent
Lu

(10) Patent No.: US 9,674,496 B2
(45) Date of Patent: Jun. 6, 2017

(54) METHOD FOR SELECTING METERING MODE AND IMAGE CAPTURING DEVICE THEREOF

(71) Applicant: Acer Incorporated, New Taipei (TW)

(72) Inventor: Jun-Liang Lu, New Taipei (TW)

(73) Assignee: Acer Incorporated, New Taipei (TW)

( * ) Notice: Subject to any disclaimer, the term of this patent is extended or adjusted under 35 U.S.C. 154(b) by 119 days.

(21) Appl. No.: 14/842,838

(22) Filed: Sep. 2, 2015

(65) Prior Publication Data

US 2016/0094825 A1   Mar. 31, 2016

(30) Foreign Application Priority Data

Sep. 30, 2014 (TW) .............................. 103133954 A

(51) Int. Cl.
*H04N 9/73* (2006.01)
*H04N 5/235* (2006.01)
*H04N 5/232* (2006.01)

(52) U.S. Cl.
CPC ............. *H04N 9/735* (2013.01); *H04N 5/235* (2013.01); *H04N 5/2351* (2013.01); *H04N 5/23245* (2013.01)

(58) Field of Classification Search
CPC ..................................................... H04N 9/735
USPC ........................................................ 348/223.1
See application file for complete search history.

(56) References Cited

U.S. PATENT DOCUMENTS

2014/0232895 A1   8/2014   Schieltz

FOREIGN PATENT DOCUMENTS

CN            101272458           11/2010

*Primary Examiner* — Usman Khan
(74) *Attorney, Agent, or Firm* — Jianq Chyun IP Office

(57) ABSTRACT

A method for selecting metering mode and an image capturing device thereof are provided. The method includes: obtaining a first exposure compensation value, a first white balance compensation value and a first focus distance corresponding to a first image; determining whether a first color temperature corresponding to the first white balance compensation value is greater than a predetermined color temperature; if yes, determining whether an ambient brightness corresponding to the first exposure compensation value is greater than a predetermined brightness, and if yes, setting a metering mode to be an average metering mode, while if not, setting the metering mode to be a center-weighted average metering mode; and if not, determining whether the first focus distance is greater than a predetermined focus distance, and if yes, setting the metering mode to be the center-weighted average metering mode, while if not, setting the metering mode to be the spot metering mode.

10 Claims, 4 Drawing Sheets

METHOD FOR SELECTING METERING MODE AND IMAGE CAPTURING DEVICE THEREOF

CROSS-REFERENCE TO RELATED APPLICATION

This application claims the priority benefit of Taiwan application serial no. 103133954, filed on Sep. 30, 2014. The entirety of the above-mentioned patent application is hereby incorporated by reference herein and made a part of this specification.

BACKGROUND OF THE INVENTION

Field of the Invention

The invention relates to an image processing technique, and more particularly, relates to a method for selecting metering mode and an image capturing device thereof.

Description of Related Art

An auto exposure (AE) mechanism has always been a very important part in the development of digital cameras. How to locate a most suitable exposure value (EV) for different scenes regardless of indoor scenes or outdoor scenes is a primary task for the digital camera to restore captured images.

Traditionally, the digital cameras usually include three different metering methods, which are an average metering mode, a center-weighted average metering mode and a spot metering mode. In a basic algorithm for metering, a full image is first divided into N blocks. After a brightness value of each of the independent blocks is calculated, the brightness value is multiplied by a weight value to which the block belongs. Lastly, a brightness of the image measured by such metering method can be obtained by summing the brightness values from each of the blocks. Accordingly, amount of the brightness to be compensated can be decided in a subsequent exposure compensation.

Different metering modes can result in significant differences under the same scene. For instance, if the average metering mode is used when a user is shooting an outdoor panoramic photo (which includes a sky area), a relatively more complete detail of the sky area can be kept in the exposure compensation because the average metering mode considers the entire frame of the image. However, in the case where the spot metering mode is used, because the spot metering mode considers only the brightness at a center area of the frame, the exposure compensation may enhance further if an object at the central area is not bright enough, leading to over exposure on the sky area which is naturally brighter. In addition, as for most of the digital cameras or cell phones, a suitable metering mode may be selected by the user freely on an interface thereof, or may be fixed to one of the metering modes. Nevertheless, under such usage scenario, the image taken by the user can easily be over exposed or without sufficient brightness.

SUMMARY OF THE INVENTION

Accordingly, the invention is directed to a method for selecting metering mode and an image capturing device thereof, which are capable of automatically selecting a metering mode most suitable for the current shooting scene, so as to achieve an optimized exposure compensation effect for capturing the image with a most suitable brightness.

The invention provides a method for selecting metering mode, which is suitable for an image capturing device, and the method for selecting metering mode includes the following. A first image is captured, and a first exposure compensation value, a first white balance compensation value and a first focus distance corresponding to the first image are obtained. Whether a first color temperature corresponding to the first white balance compensation value is greater than a predetermined color temperature is determined. If the first color temperature is greater than the predetermined color temperature, whether an ambient brightness corresponding to the first exposure compensation value is greater than a predetermined brightness is determined. If the ambient brightness is greater than the predetermined brightness, a metering mode is set to be an average metering mode. If the ambient brightness is not greater than the predetermined brightness, the metering mode is set to be a center-weighted average metering mode. If the first color temperature is not greater than the predetermined color temperature, whether the first focus distance is greater than a predetermined focus distance is determined. If the first focus distance is greater than the predetermined focus distance, the metering mode is set to be the center-weighted average metering mode. If the first focus distance is not greater than the predetermined focus distance, the metering mode is set to be a spot metering mode. A second image is metered according to the metering mode being set.

The invention provides an image capturing device, which includes an image capturing unit, a storage unit and a processing unit. The image capturing unit captures a plurality of images. The storage unit is configured to store a plurality of modules. The processing unit is coupled to the image capturing unit and the storage unit, and configured to access and execute the modules stored by the storage unit. The modules include an exposure compensation module, a white balance compensation module, a focusing module and a metering module. The exposure compensation module is configured to obtain a first exposure compensation value corresponding to a first image. The white balance compensation module is configured to obtain a first white balance compensation value corresponding to the first image. The focusing module is configured to obtain a first focus distance corresponding to the first image. The metering module is configured to determine whether a first color temperature corresponding to the first white balance compensation value is greater than a predetermined color temperature. If the first color temperature is greater than the predetermined color temperature, the metering module determines whether an ambient brightness corresponding to the first exposure compensation value is greater than a predetermined brightness. If the ambient brightness is greater than the predetermined brightness, the metering module sets the metering mode to be the average metering mode. If the ambient brightness is not greater than the predetermined brightness, the metering module sets the metering mode to be the center-weighted average metering mode. If the first color temperature is not greater than the predetermined color temperature, the metering module determines whether the first focus distance is greater than a predetermined focus distance. If the first focus distance is greater than the predetermined focus distance, the metering module sets the metering mode to be the center-weighted average metering mode. If the first focus distance is not greater than the predetermined focus distance, the metering module sets the metering mode to be the spot metering mode. The metering module meters a second image according to the metering mode being set.

In summary, in the method for selecting metering mode and the image capturing device thereof, the image capturing device analyzes and determines a scene that the user is shooting by using the color temperature, the brightness and the focus distance of the previous image, and selects the most suitable metering mode according to that scene. Accordingly, the image capturing device is capable of achieving the most suitable exposure compensation effect so as to capture the image with the most suitable brightness.

To make the above features and advantages of the disclosure more comprehensible, several embodiments accompanied with drawings are described in detail as follows.

DESCRIPTION OF THE EMBODIMENTS

Figure 1:
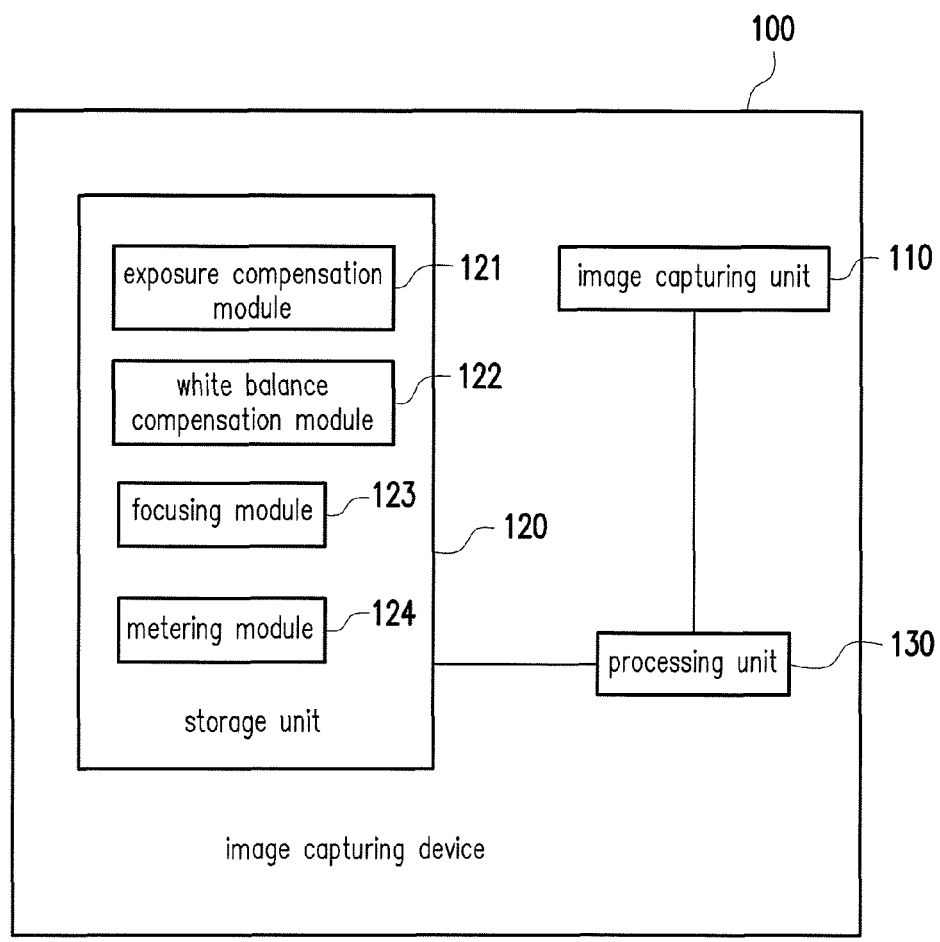
FIG. 1 is a block diagram illustrating an image capturing device according to an embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

A digital camera is adapted for different metering modes under different shooting scenes. Generally, for photos of outdoor landscapes, because objects to be considered are relatively more and details of the sky area must be kept, it is more suitable to use the average metering mode so that each of the objects may receive the same weight. For a common indoor scene, because a center object is usually a focused object, and a brightness of indoor light source must be kept, it is more suitable to use the center-weighted average metering mode. The spot metering mode is more suitable for shooting close-up photo of people instead of a panoramic photo because it only considers for calculation of a brightness on a center point. Accordingly, if the corresponding metering mode can be automatically switched to, based on a current shooting scene so that the user can capture the image with the most suitable brightness without setting anything, a shooting action of the user and an exposure quality of the image may both be improved. Based on the above, the invention provides a method for selecting metering mode and an image capturing device thereof. In order to make the present invention more comprehensible, embodiments are described below as examples to demonstrate that the present invention can actually be realized.

FIG. 1 is a block diagram illustrating an image capturing device according to an embodiment of the invention. The image capturing device 100 includes an image capturing unit 110, a storage unit 120 and a processing unit 130. The image capturing device 100 of the present embodiment is, for example, a digital camera, a digital single lens reflex (DSLR) camera, a digital video camcorder (DVC), or other smart phones and tablet computers having image/video capturing functions, but the invention is not limited to the above.

The image capturing unit 110 may include a lens, an optical sensing element, an aperture and so on. The lens is, for example, a standard lens, a wide-angle lens, a zoom lens and so on. The optical sensing element is, for example, a charge coupled device (CCD), a complementary metal-oxide semiconductor (CMOS) device or other devices. The lens, the optical sensing element, or a combination thereof are not particularly limited in the invention. When the image capturing unit 110 detects a shutter signal, the image capturing unit 110 is capable of continuously capturing a plurality of images.

The storing unit 120 is, for example, a memory, a hard disk or other devices capable of storing data, and configured to store a plurality of modules. The modules include an exposure compensation module 121, a white balance compensation module 122, a focusing module 123 and a metering module 124, which are stored in the storage unit 120 in form of program codes.

The processing unit 130 is coupled to the image capturing unit 110 and the storage unit 120, and may be a central processing unit (CPU) or other programmable devices for general purpose or special purpose such as a microprocessor, a digital signal processor (DSP), a programmable controller, an application specific integrated circuit (ASIC), a programmable logic device (PLD) or other similar devices or a combination of above-mentioned devices. The processing unit 130 is configured to access and execute the exposure compensation module 121, the white balance compensation module 122, the focusing module 123 and the metering module 124 stored in the storage unit 120, so as to perform an image processing on the images.

In the present embodiment, the image capturing device 100 is capable of analyzing the current shooting scene according to a brightness, a color temperature and focus information of the shooting scene, so as to select the metering mode most suitable for the current shooting scene and accordingly achieve the optimized exposure compensation effect. Detailed description is provided as below.

Figure 2A:
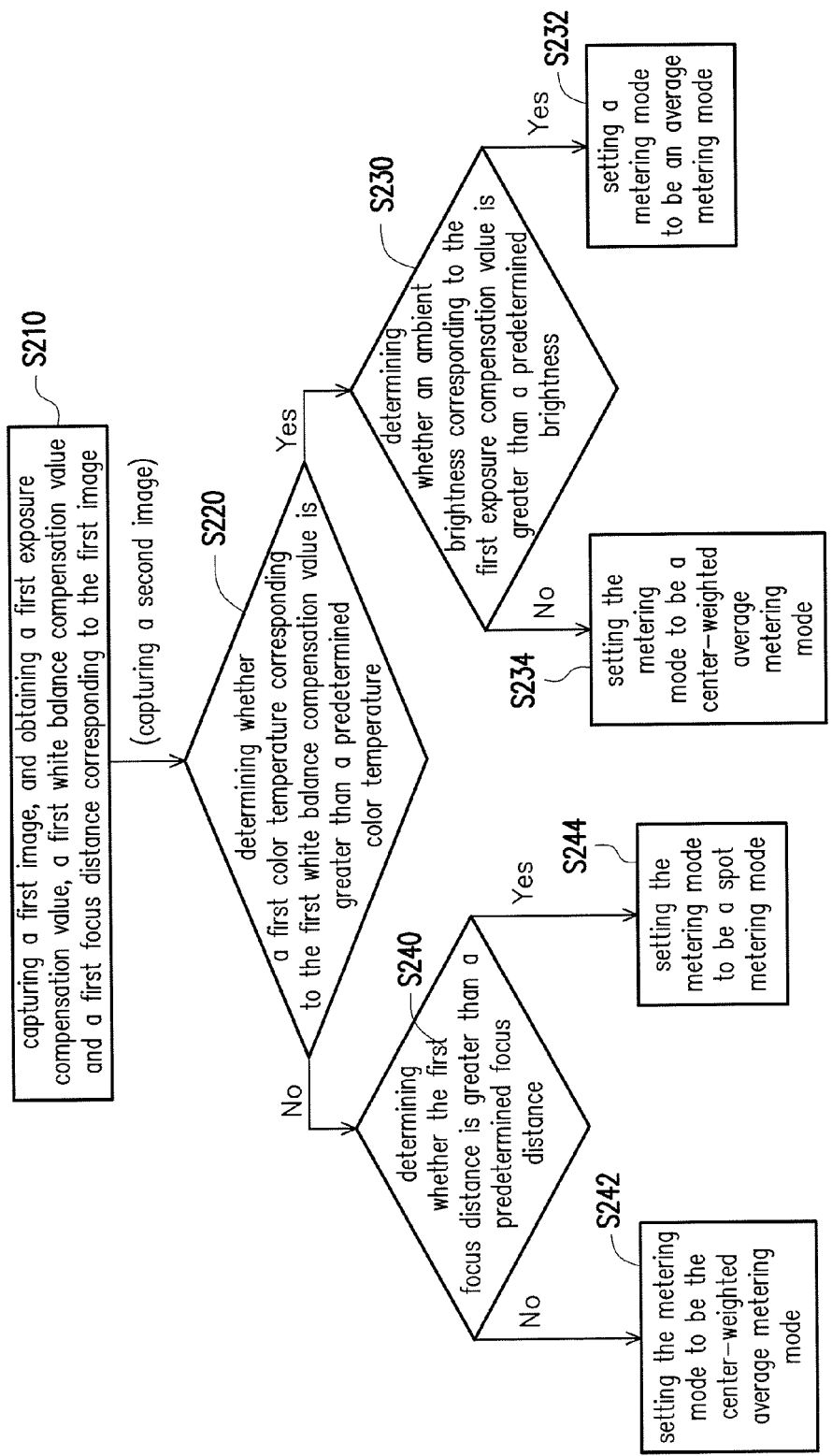
FIG. 2A and FIG. 2B are flowcharts illustrating a method for selecting metering mode according an embodiment of the invention.
Figure 2B:
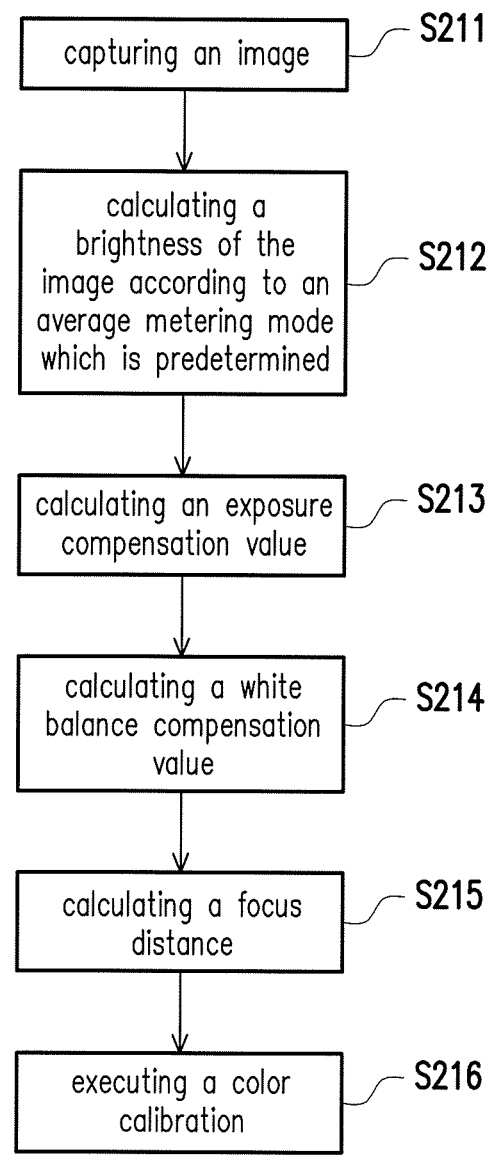

FIG. 2A and FIG. 2B are flowcharts illustrating a method for selecting metering mode according an embodiment of the invention. The method proposed by the present embodiment may be implemented by the image capturing device 100 depicted in FIG. 1, and each step of the present embodiment is described in detail with reference to each element depicted in FIG. 1.

Referring to FIG. 1 and FIG. 2A, in step S210, the image capturing unit 110 captures a first image; and after the image processing is performed on the first image, the exposure compensation module 121 obtains a first exposure compensation value corresponding to the first image, the white balance compensation module 122 obtains a first white balance compensation value corresponding to the first image, and the focusing module 123 obtains a first focus distance corresponding to the first image. Specifically, as shown in FIG. 2B, after the first image is captured by the image capturing unit 110 (step S211), the metering module 124 calculates a first brightness of the first image according to an average metering mode which is predetermined (step S212). Naturally, in other embodiments, the metering module 124 may also calculates the first brightness by using other predetermined metering modes (e.g., the center-weighted average metering mode or the spot metering mode, etc.), which are not particularly limited in the invention. Subsequently, the exposure compensation module 121 calculates the first exposure compensation value according to the first brightness (step S213), the white balance compensation module 122 calculates the first white balance compensation value according to the first brightness (step S214), and the focusing module 123 calculates the first focus distance according to the first brightness (step S215). Then, the processing unit 130 may execute a color calibration subsequently according to the first exposure compensation value, the first white balance compensation value and the first focus distance (S216), so as to complete the image processing for the first image.

In the present embodiment, when a second image is captured by the image capturing unit 110, the processing unit 130 may analyze and determine the scene where the user is shooting according to image processing information (e.g., brightness, color temperature and focus distance) corresponding to the first image obtained after the image processing of steps S211 to S216 is performed on the first image, so as to automatically select the most suitable metering mode for the current shooting scene.

Referring to FIG. 2A, in step S220, the metering module 124 determines whether a first color temperature corresponding to the first white balance compensation value is greater than a predetermined color temperature according to the first white balance compensation value of the first image. The predetermined color temperature is, for example, 5000K, which is a color temperature corresponding to an outdoor scene. However, the present embodiment is not limited by such color temperature, and the user may set the predetermined color temperature according to the current shooting scene.

If the first color temperature is greater than the predetermined color temperature, as shown in step S230, the metering module 124 determines whether an ambient brightness corresponding to the first exposure compensation value is greater than a predetermined brightness. It should be noted that, it is assumed herein that only daylight can reach 5000K, and the predetermined color temperature is set to be 5000K. Therefore, if the first color temperature reaches or is greater than 5000K, it indicates that the user is likely shooting at the outdoor scene. In this case, the metering module 124 may analyze the ambient brightness when shooting the first image according to the first exposure compensation value of the first image, and determines which of scenes was the shooting scene corresponding to, based on such ambient brightness.

Figure 3:
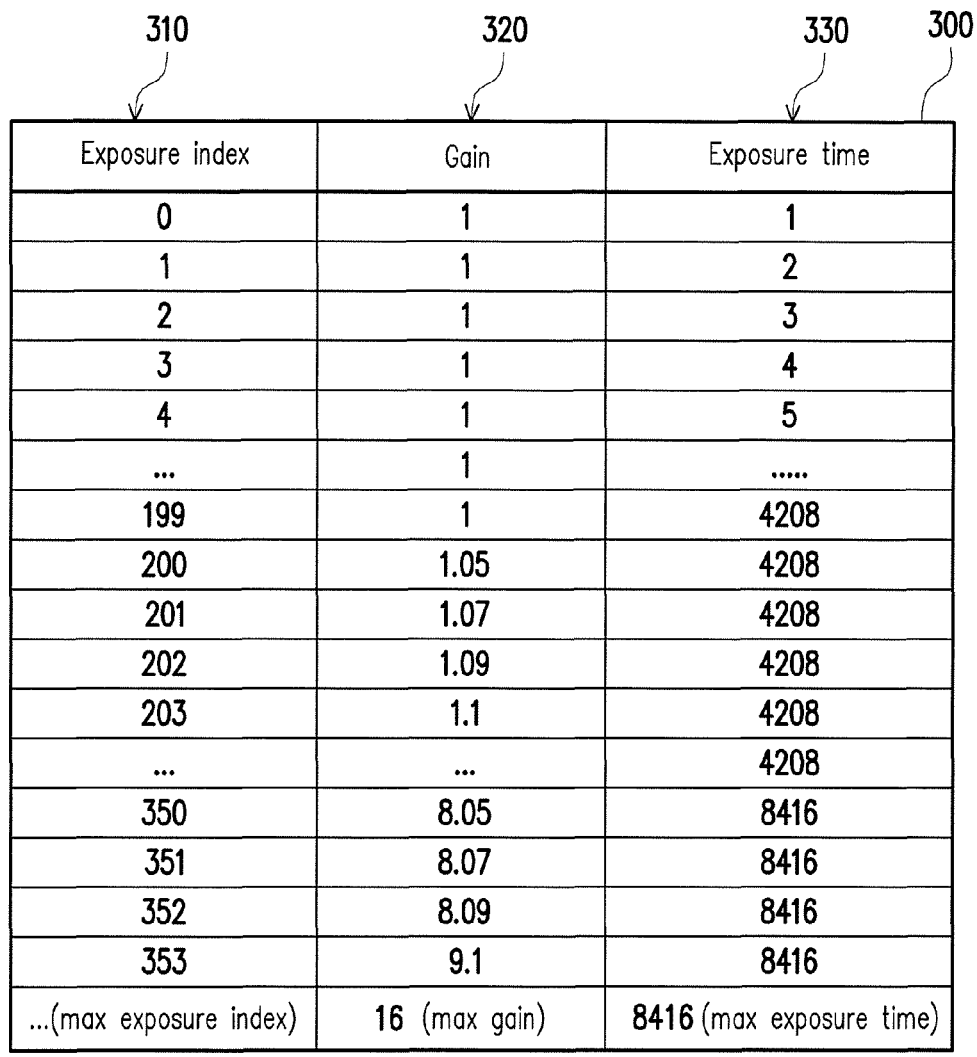
FIG. 3 is a schematic diagram illustrating an exposure parameter table according to an embodiment of the invention.

Specifically, the first exposure compensation value represents a brightness that is required to be compensated on the first image (i.e., a difference between the first brightness calculated after metering the first image by the predetermined metering mode and a final brightness after the exposure compensation). For instance, if the first brightness of the first image calculated according to the average metering mode is 50 and the final brightness from the exposure compensation of the exposure compensation module 121 is 120, the first exposure compensation value is 70. Subsequently, the metering module 124 searches an exposure parameter table for obtaining an exposure index corresponding to the first exposure compensation value. As shown in FIG. 3, an exposure parameter table 300 may record a plurality of exposure indexes 310 and exposure parameters (e.g., a gain 320, an exposure time 330, or an aperture (not illustrated)) corresponding to each of the exposure indexes. The exposure compensation module 121 may perform the exposure compensation according to the exposure gain and the exposure time of the exposure index in the exposure parameter table.

In the present embodiment, the exposure parameter table may be obtained through training, in which different exposure indexes are corresponding to different brightnesses, respectively. In other words, if the exposure index is greater (i.e., the brightness is smaller when shooting), it indicates that the brightness to be compensated is more. Furthermore, in the present embodiment, a predetermined exposure index corresponding to the predetermined brightness may be set to be, for example, 200. The predetermined brightness can represent the brightness of the shooting at the outdoor scene. Therefore, after searching the exposure index corresponding to the first exposure compensation value, the metering module 124 may determine whether this corresponding exposure index is less than the predetermined exposure index. If the exposure index is less than the predetermined exposure index, it indicates that the ambient brightness is greater than the predetermined brightness (i.e., the brightness of the shooting at the outdoor scene). Accordingly, the metering module 124 is capable of determining whether the ambient brightness belongs to a result obtained from the shooting at the outdoor scene by determining whether the exposure index corresponding to the first exposure compensation value is less than the predetermined exposure index.

If the ambient brightness is greater than the predetermined brightness, as shown in step S232, the metering module 124 sets the metering mode to be the average metering mode. Otherwise, if the ambient brightness is not greater than the predetermined brightness, as shown in step S234, the metering module 124 sets the metering mode to be the center-weighted average metering mode. In other words, if the first color temperature is greater than the predetermined color temperature, and the ambient brightness corresponding to the first exposure compensation value is also greater than the predetermined brightness, it indicates that the user is shooting at the outdoor scene. Therefore, the metering module 124 automatically sets the metering mode to the average metering mode. Otherwise, if the first color temperature is greater than the predetermined color temperature, but the ambient brightness corresponding to the first exposure compensation value is not greater than the predetermined brightness, it indicates that the user is at a scene close to the outdoor. Therefore, the metering module 124 sets the metering mode to the center-weighted average metering mode.

If it is determined in step S220 that the first color temperature is not greater than the predetermined color temperature, as shown in step S240, the metering module 124 determines whether the first focus distance is greater than a predetermined focus distance, and the predetermined focus distance may be set by the user. It should be noted that, when the first color temperature is not greater than the predetermined color temperature, it indicates that the image capturing device 100 is most likely shooting at an indoor scene, and thus the metering module 124 may further utilize the focus distance for confirmation.

If the first focus distance is greater than the predetermined focus distance, as shown in step S242, the metering module 124 sets the metering mode to be the center-weighted average metering mode. If the first focus distance is not greater than the predetermined focus distance, as shown in step S244, the metering module 124 sets the metering mode to be the spot metering mode. In other words, when the first focus distance is greater than the predetermined focus distance, it indicates that the image capturing unit 110 is shooting the panoramic photo at the indoor scene. Therefore, the metering module 124 adopts the center-weighted average metering mode for metering. On the other hand, when the first focus distance is not greater than the predetermined focus distance (i.e., the first focus distance is macro), it indicates that the image capturing unit 110 is shooting in a close range (e.g., a close-up shooting at the indoor scene). Therefore, the metering module 124 adopts the spot metering mode for metering.

Lastly, as shown in steps S211 and S212, the metering module 124 meters the second image according to the metering mode being set as above. Further, the exposure compensation module 121 calculates a second exposure compensation value by performing an exposure compensation on the second image according to a result (i.e., a second brightness) obtained after metering the second image (step S213), the white balance compensation module 122 calculates a second white balance compensation value by performing a white balance compensation on the second image according to the second brightness (step S214), and the focusing module 123 calculates a second focus distance according to the second brightness (step S215). Then, the processing unit 130 may execute a color calibration subsequently according to the second exposure compensation value, the second white balance compensation value and the second focus distance (S216), so as to complete the image processing for the second image. Accordingly, by analyzing the brightness and the color temperature at the shooting scene and the focus information of the shooting, the image capturing device 110 is capable of automatically selecting the most suitable metering mode, so as to achieve the optimized exposure compensation effect for capturing the image with the most suitable brightness.

In summary, in the method for selecting metering mode and the image capturing device thereof, the image capturing device analyzes the previous image being captured to obtain the color temperature, the brightness and the focus distance of the previous image for determining whether the scene where the user is shooting belongs to the outdoor scene (i.e., the color temperature is greater than the predetermined color temperature and the brightness is greater than the predetermined brightness); the scene close to the outdoor (i.e., the color temperature is greater than the predetermined color temperature but the brightness is not greater than the predetermined brightness); the panoramic photo at the indoor scene (i.e., the color temperature is not greater than the predetermined color temperature and the focus distance is greater than the predetermined focus distance); or the close-up shooting at the indoor scene (i.e., the color temperature is not greater than the predetermined color temperature and the focus distance is not greater than the predetermined focus distance). Further, when it is analyzed that the shooting scene belongs to the outdoor scene, the image capturing device sets the metering mode to be the average metering mode. When it is analyzed that the shooting scene belongs to the scene close to the outdoor, the image capturing device sets the metering mode to be the center-weighted average metering mode. When it is analyzed that the shooting scene belongs to the panoramic photo at the indoor scene, the image capturing device sets the metering mode to be the center-weighted average metering mode. When it is analyzed that the shooting scene belongs to close-up shooting at the indoor scene, the image capturing device sets the metering mode to be the spot metering mode. As such, the image capturing device may perform the image processing on the subsequent images according to the metering mode being set, so as to achieve the optimized and most suitable exposure compensation effect. Accordingly, the user is able to utilize the image capturing device to capture the image with the most suitable brightness.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for selecting metering mode, suitable for an image capturing device, the method for selecting metering mode comprising:
   capturing a first image, and obtaining a first exposure compensation value, a first white balance compensation value and a first focus distance corresponding to the first image;
   determining whether a first color temperature corresponding to the first white balance compensation value is greater than a predetermined color temperature;
   if the first color temperature is greater than the predetermined color temperature, determining whether an ambient brightness corresponding to the first exposure compensation value is greater than a predetermined brightness, wherein if the ambient brightness is greater than the predetermined brightness, setting a metering mode to be an average metering mode, while if the ambient brightness is not greater than the predetermined brightness, setting the metering mode to be a center-weighted average metering mode;
   if the first color temperature is not greater than the predetermined color temperature, determining whether the first focus distance is greater than a predetermined focus distance, wherein if the first focus distance is greater than the predetermined focus distance, setting the metering mode to be the center-weighted average metering mode, while if the first focus distance is not greater than the predetermined focus distance, setting the metering mode to be a spot metering mode; and
   metering a second image according to the metering mode being set.

2. The method for selecting metering mode according to claim 1, wherein the step of obtaining the first exposure compensation value, the first white balance compensation value and the first focus distance corresponding to the first image comprises:
   calculating a first brightness of the first image according to the average metering mode; and
   calculating the first exposure compensation value, the first white balance compensation value and the first focus distance according to the first brightness.

3. The method for selecting metering mode according to claim 1, wherein the step of determining whether the ambient brightness corresponding to the first exposure compensation value is greater than the predetermined brightness comprises:
   searching an exposure parameter table for obtaining an exposure index corresponding to the first exposure compensation value;
   determining whether the exposure index is less than a predetermined exposure index; and
   if the exposure index is less than the predetermined exposure index, determining that the ambient brightness corresponding to the first exposure compensation value is greater than the predetermined brightness.

4. The method for selecting metering mode according to claim 3, wherein the exposure parameter table records a plurality of compensating parameters corresponding to the exposure index, and the method for selecting metering mode further comprises performing an exposure compensation according to the compensating parameters.

5. The method for selecting metering mode according to claim 1, wherein after the step of metering the second image according to the metering mode being set, the method for selecting metering mode further comprises:

performing an exposure compensation and a white balance compensation on the second image according to a result obtained after metering the second image.

6. An image capturing device, comprising:

an image capturing unit, capturing a plurality of images;

a storage unit, storing a plurality of modules; and a processing unit, coupled to the image capturing unit and the storage unit to access and execute the modules stored by the storage module, wherein the modules comprise:

an exposure compensation module, obtaining a first exposure compensation value corresponding to a first image;

a white balance compensation module, obtaining a first white balance compensation value corresponding to the first image;

a focusing module, obtaining a first focus distance corresponding to the first image; and a metering module, determining whether a first color temperature corresponding to the first white balance compensation value is greater than a predetermined color temperature; determining whether an ambient brightness corresponding to the first exposure compensation value is greater than a predetermined brightness if the first color temperature is greater than the predetermined color temperature, wherein if the ambient brightness is greater than the predetermined brightness, the metering module sets a metering mode to be an average metering mode, while if the ambient brightness is not greater than the predetermined brightness, the metering module sets the metering mode to be a center-weighted average metering mode; determining whether the first focus distance is greater than a predetermined focus distance if the first color temperature is not greater than the predetermined color temperature, wherein if the first focus distance is greater than the predetermined focus distance, the metering module sets the metering mode to be the center-weighted average metering mode, while if the first focus distance is not greater than the predetermined focus distance, the metering module sets the metering mode to be a spot metering mode; and metering a second image according to the metering mode being set.

7. The image capturing device according to claim 6, wherein the metering module calculates a first brightness of the first image according to the average metering mode, the exposure compensation module calculates the first exposure compensation value according to the first brightness, the white balance compensation module calculates the first white balance compensation value according to the first brightness, and the focusing module calculates the first focus distance according to the first brightness.

8. The image capturing device according to claim 6, wherein the metering module searches an exposure parameter table for obtaining an exposure index corresponding to the first exposure compensation value, determines whether the exposure index is less than a predetermined exposure index, and determines that the ambient brightness corresponding to the first exposure compensation value is greater than the predetermined brightness if the exposure index is less than the predetermined exposure index.

9. The image capturing device according to claim 8, wherein the exposure parameter table records a plurality of compensating parameters corresponding to the exposure index, and the exposure compensation module performs an exposure compensation according to the compensating parameters.

10. The image capturing device according to claim 6, wherein the exposure compensation module performs an exposure compensation on the second image according to a result obtained after metering the second image, and the white balance compensation module performs a white balance compensation on the second image according to the result obtained after metering the second image.

* * * * *